US012790419B2

(12) United States Patent
Gai et al.

(10) Patent No.: US 12,790,419 B2
(45) Date of Patent: Nov. 10, 2026

(54) VANADIUM-BASED CATALYTIC SYSTEM INCLUDING ACTIVATOR AND METHOD FOR OLEFIN POLYMERIZATION

(71) Applicant: Changchun University of Technology, Changchun (CN)

(72) Inventors: Fangyuan Gai, Changchun (CN); Xiaogang Zhao, Changchun (CN); Huixuan Zhang, Changchun (CN)

(73) Assignee: Changchun University of Technology, Changchun (CN)

( * ) Notice: Subject to any disclaimer, the term of this patent is extended or adjusted under 35 U.S.C. 154(b) by 605 days.

(21) Appl. No.: 18/358,218

(22) Filed: Jul. 25, 2023

(65) Prior Publication Data

US 2025/0034297 A1 Jan. 30, 2025

(30) Foreign Application Priority Data

Jul. 24, 2023 (CN) ......................... 202310908224.1

(51) Int. Cl.
*C08F 210/02* (2006.01)
*C08F 210/06* (2006.01)
*C08F 210/16* (2006.01)

(52) U.S. Cl.
CPC .......... *C08F 210/02* (2013.01); *C08F 210/06* (2013.01); *C08F 210/16* (2013.01)

(58) Field of Classification Search
CPC .... C08F 210/02; C08F 210/06; C08F 210/16; C08F 2410/01
See application file for complete search history.

(56) References Cited

U.S. PATENT DOCUMENTS 4,435,552 A * 3/1984 Evens .................. C08F 210/16 526/140

FOREIGN PATENT DOCUMENTS

JP 2006290971 * 10/2006

* cited by examiner

*Primary Examiner* — Kumar R Bhushan
(74) *Attorney, Agent, or Firm* — Hemisphere Law, PLLC

(57) ABSTRACT

A vanadium-based catalytic system including an activator substituted by multiple halogen atoms and a method for olefin polymerization are provided. The activator provided by the vanadium-based catalytic system is a halogenated ethyl phenylacetate substituted by at least two of the multiple halogen atoms. One of a phenyl position and a benzyl position of the halogenated ethyl phenylacetate is substituted by at least one of the multiple halogen atoms. The vanadium-based catalytic system is used for synthesizing the EPR, thereby improving an activity of copolymerization during the synthesizing, and reducing consumptions of a catalyst and a cocatalyst simultaneously, reducing residual amount of the catalyst and the cocatalyst in an obtained product rubber, reducing production cost, and making the product rubber post-treated easily.

5 Claims, No Drawings

VANADIUM-BASED CATALYTIC SYSTEM INCLUDING ACTIVATOR AND METHOD FOR OLEFIN POLYMERIZATION

TECHNICAL FIELD

The disclosure relates to the field of vanadium-based catalytic system technology, particularly to a vanadium-based catalytic system including an activator substituted by halogen atoms and a method for olefin polymerization.

BACKGROUND

An ethylene propylene rubber (EPR) belongs to a synthetic rubber with ethylene and propylene as main monomers. According to compositions of comonomers, the EPR can be mainly divided into two types, such as an ethylene propylene monomer (EPM) and an ethylene propylene diene monomer (EPDM). The EPR is one of the fast-developing synthetic rubber varieties since 1980s. It is widely used in automobile components, waterproof building materials, oil additives and polymer modifiers, and a consumption of the EPR is increasing every year in the world. In order to improve a quality and a yield of rubber products, a most important method is to develop a catalytic system used in producing the EPR. Although the catalytic system used in producing the EPR has developed from a single Ziegler-Natta catalytic system to coexistence of Ziegler-Natta catalytic system, metallocene catalytic system and non-metallocene catalytic system, a Ziegler-Natta vanadium-based catalytic system (hereinafter referred to as a vanadium-based catalytic system) is still of great significance for producing the EPR. Common vanadium-based catalysts used in this system are vanadium oxytrichloride ($VOCl_3$), vanadium tetrachloride ($VCl_4$), vanadium (III) acetylacetonate abbreviated as $V(acac)_3$, etc., and a cocatalyst is usually determined as an alkyl aluminum chloride. However, the vanadium-based catalysts have obvious disadvantages such as low activity and easy deactivation. If an amount of the vanadium-based catalyst is increased to compensate for the lack of activity of the vanadium-based catalyst system, it will lead to an increase of vanadium content in the rubber product, resulting in a difficulty of post-treatment of the rubber product and affecting an application of the rubber product. Moreover, due to the increasing amount of the vanadium-based catalyst, a cost for storing the vanadium-based catalyst will also increase greatly.

Many studies have found that adding an activator to the vanadium-based catalytic system can reactivate the deactivated vanadium, thus prolonging a service life of the vanadium-based catalyst and increasing its activity. Therefore, it is one of the important methods to reduce production cost and increase polymerization activity by adding a suitable activator to form a new vanadium-based catalytic system. The United States patent publication No. U.S. Pat. No. 4,181,790A discloses a vanadium-based catalyst using a 2,3,4,4-tetrachloro-3-butenoic acid as an activator, and it is found that a polymerization yield of the obtained vanadium-based catalyst is high, but the vanadium compound activated by the activator is very sensitive to air and water, thereby making practical application conditions harsh. In addition, Japanese patent publication No. 1973-071492 discloses that a vanadium-based catalyst with an anthraquinone oxide as an activator has a high activity but a poor compatibility. Moreover, Chinese patent publication No. CN85108910A discloses that an activity of a catalyst with a trichlorofluoromethane and a silicon tetrachloride as activators is high, but the silicon tetrachloride is corrosive and may cause pollution to an obtained rubber product.

SUMMARY

In view of the above, objectives of the disclosure are to provide a vanadium-based catalytic system including an activator substituted by multiple halogen atoms and to provide a method of synthesizing an ethylene propylene rubber (EPR). The vanadium-based catalytic system provide by the disclosure can not only improve an activity of copolymerization during synthesizing the EPR, but also reduce consumptions of a main catalyst and a cocatalyst. Furthermore, the disclosure can reduce rubber production cost and make a post-treatment of the rubber product easier.

In order to achieve the above objectives, the disclosure provides a technical solution as follows: a vanadium-based catalytic system including an activator substituted by multiple halogen atoms. The activator is a halogenated ethyl phenylacetate substituted by at least two of the multiple halogen atoms, and one of a phenyl position and a benzyl position of the halogenated ethyl phenylacetate is substituted by at least one of the multiple halogen atoms.

In an embodiment, the activator is at least one selected from a group consisting of an ethyl 2,4-dichlorophenyl acetate, an ethyl 3,4-dichlorophenyl acetate, an ethyl 2,3-difluorophenyl acetate, an ethyl 2,6-difluorophenyl acetate, an ethyl 3-fluoro-4-chlorophenyl acetate, an ethyl 2-fluoro-2-(2-fluorophenyl) acetate, an ethyl 2-fluoro-2-(2-chlorophenyl) acetate, an ethyl 2-fluoro-2-(2-bromophenyl) acetate, an ethyl 2-chloro-2-(2-fluorophenyl) acetate, an ethyl 2-chloro-2-(2-chlorophenyl) acetate, an ethyl 2-chloro-2-(2-bromophenyl) acetate, an ethyl 2-chloro-2-(4-chlorophenyl) acetate, an ethyl 2-fluoro-2-(3,4-dibromophenyl) acetate, an ethyl 2,2-difluoro-2-(3-chlorophenyl) acetate, a 2-chlorophenylacetic acid-β-chloroethanol ester, a 2-fluorophenyl acetic acid-β-chloroethanol ester, and a 2-chloro-2-(2-chlorophenyl) acetic acid-β-chloroethanol ester.

In an embodiment, the vanadium-based catalytic system further includes a vanadium-based main catalyst (also referred to a vanadium-based catalyst), a general chemical formula of the vanadium-based main catalyst is $VO(OR)_nCl_m$, a vanadium contained in the vanadium-based main catalyst is a quinquevalence vanadium, OR represents an alkoxy group, n is 1, or 2, or 3, m is 1, or 2, or 3, and m+n is equal to 3.

In an embodiment, in the general chemical formula of the vanadium-based main catalyst, the alkoxy is at least one selected from a group consisting of a methoxyl group, an ethoxy group, an n-propoxy group, an iso-propoxy group, an n-butoxy group, an iso-butoxy group, a tert-butoxy group, an n-pentyloxy group, an n-hexoxy group, and a cyclohexyloxy group.

In an embodiment, the vanadium-based catalytic system further includes a cocatalyst, and the cocatalyst is an organo-aluminum compound.

In an embodiment, a molar ratio of aluminum atoms contained in the cocatalyst to the vanadium contained in the vanadium-based catalyst is (1-100):1; and a molar ratio of the activator to the vanadium contained in the vanadium-based catalyst is (5-80):1.

The disclosure further provides a method for olefin polymerization, including: performing copolymerization on an ethylene, a propylene, and a molecular weight regulator in the vanadium-based catalytic system described in the above technical solution; or performing copolymerization on an ethylene, a propylene, an diolefin, and a molecular weight regulator in the vanadium-based catalytic system described in the above technical solution.

In an embodiment, the molecular weight regulator is hydrogen.

In an embodiment, the diolefin is one of a 5-ethylidene-2-norbornene, a dicyclopentadiene, and a 1,4-hexadiene.

In an embodiment, a temperature of the copolymerization is in a range of 0 degree Celsius (° C.) to 75° C.; a time of the copolymerization is in a range of 10 minutes to 180 minutes; and a pressure of the copolymerization is in a range of 0.1 mega Pascal (MPa) to 1.0 MPa.

Beneficial effects of the disclosure are as follows.

The activator included in the vanadium-based catalytic system provided by the disclosure is the halogenated ethyl phenylacetate substituted by the at least two of the multiple halogen atoms, and the phenyl position or the benzyl position of the halogenated ethyl phenylacetate is substituted by the at least one of the multiple halogen atoms. When the vanadium-based catalytic system provided by the disclosure is applied for synthesizing the EPR, the activity of the copolymerization reaction in synthesizing the EPR can be improved, at the same time, the consumptions of the main catalyst and the cocatalyst can be reduced, the residual amount of the catalysts (i.e., the main catalyst and the cocatalyst) in the product rubber (i.e., a dry rubber) can be reduced, the rubber production cost can be reduced, and the post-treatment of the product rubber is easier.

DETAILED DESCRIPTION OF EMBODIMENTS

The disclosure provides a vanadium-based catalytic system, including an activator substituted by multiple halogen atoms. The activator is a halogenated ethyl phenylacetate substituted by at least two of the halogen atoms, and a phenyl position or a benzyl position of the halogenated ethyl phenylacetate is substituted by at least one of the multiple halogen atoms.

In the disclosure, the activator is at least one selected from a group consisting of an ethyl 2,4-dichlorophenyl acetate, an ethyl 3,4-dichlorophenyl acetate, an ethyl 2,3-difluorophenyl acetate, an ethyl 2,6-difluorophenyl acetate, an ethyl 3-fluoro-4-chlorophenyl acetate, an ethyl 2-fluoro-2-(2-fluorophenyl) acetate, an ethyl 2-fluoro-2-(2-chlorophenyl) acetate, an ethyl 2-fluoro-2-(2-bromophenyl) acetate, an ethyl 2-chloro-2-(2-fluorophenyl) acetate, an ethyl 2-chloro-2-(2-chlorophenyl) acetate, an ethyl 2-chloro-2-(2-bromophenyl) acetate, an ethyl 2-chloro-2-(4-chlorophenyl) acetate, an ethyl 2-fluoro-2-(3,4-dibromophenyl) acetate, an ethyl 2,2-difluoro-2-(3-chlorophenyl) acetate, a 2-chlorophenylacetic acid-β-chloroethanol ester, a 2-fluorophenyl acetic acid-β-chloroethanol ester, and a 2-chloro-2-(2-chlorophenyl) acetic acid-β-chloroethanol ester.

In the disclosure, the vanadium-based catalytic system further includes a vanadium-based main catalyst (also referred to a vanadium-based catalyst); a general chemical formula of the vanadium-based main catalyst is $VO(OR)_nCl_m$, a vanadium contained in which is a quinquevalence vanadium, OR represents an alkoxy group, n is 1, or 2, or 3, m is 1, or 2, or 3, and m+n is equal to 3.

In the disclosure, in the chemical formula of the vanadium-based main catalyst, the alkoxy is at least one selected from a group consisting of a methoxyl group, an ethoxy group, an n-propoxy group, an iso-propoxy group, an n-butoxy group, an iso-butoxy group, a tert-butoxy group, an n-pentyloxy group, an n-hexoxy group, and a cyclohexyloxy group.

In the disclosure, the vanadium-based catalytic system further includes a cocatalyst, and the cocatalyst is an organoaluminum compound. In an illustrated embodiment, the cocatalyst is an alkyl aluminum chloride. In an another illustrated embodiment, the cocatalyst is at least one selected from a group consisting of an dimethyl aluminum monochloride, an diethyl aluminum monochloride, an di-n-butyl aluminum monochloride, an di-iso-butyl aluminum monochloride, an methyl aluminum dichloride, an ethyl aluminum dichloride, an n-butyl aluminum dichloride, an iso-butyl aluminum dichloride, a trichlorotrimethyl dialuminum, an ethylaluminum sesquichloride, a sesquin-n-butyl aluminum chloride, and a sesqui-iso-butyl aluminum chloride. In a still another illustrated embodiment, the cocatalyst is determined as the ethylaluminum sesquichloride.

In the disclosure, a molar ratio of aluminum atoms contained in the cocatalyst to the vanadium contained in the vanadium-based main catalyst is (1-100):1, and in an illustrated embodiment, the molar ratio is (20-60):1. In the disclosure, a molar ratio of the activator to the vanadium contained in the vanadium-based main catalyst is (5-80):1; in an illustrated embodiment, the molar ratio is (5-20):1; and in a still illustrated embodiment, the molar ratio is (5-10):1.

The disclosure further provides a method for olefin polymerization, including performing copolymerization on an ethylene, a propylene, and a molecular weight regulator in the vanadium-based catalytic system described in the above technical solution; or performing copolymerization on an ethylene, a propylene, a diolefin, and a molecular weight regulator in the vanadium-based catalytic system described in the above technical solution.

In the disclosure, the molecular weight regulator is hydrogen. A molar ratio of the hydrogen in a mixture of the ethylene, the propylene, and the hydrogen is in a range of 1% to 3%.

In the disclosure, in a mixture of the ethylene and the propylene, a molar ratio of the propylene to the ethylene is (1-5):1.

In the disclosure, the diolefin is one of a 5-ethylidene-2-norbornene (abbreviated as ENB), a dicyclopentadiene, and a 1,4-hexadiene.

In the disclosure, the copolymerization includes a polymerization solvent. In an illustrated embodiment, the polymerization solvent selects from aliphatic alkanes or a naphthenic hydrocarbon; in another illustrated embodiment, the polymerization solvent is a cyclohexane; and in a still another embodiment, the polymerization solvent is a hexane.

In the disclosure, the copolymerization further includes a terminator, and in an illustrated embodiment, the terminator is an ethanol.

In the disclosure, a temperature of the copolymerization is in a range of 0 degree Celsius (° C.) to 75° C.; a time of the copolymerization is in a range of 10 minutes to 180 minutes; and a pressure of the copolymerization is in a range of 0.1 mega Pascal (MPa) to 1.0 MPa.

In the disclosure, when the ethylene, the propylene, and the molecular weight regulator are copolymerized under the vanadium-based catalytic system described in the above technical solution, the copolymerization is carried out as follows.

A reactor is subjected to anhydrous and anaerobic treatment, and then a solvent equivalent to 40%-70% of the reactor volume is added to the reactor, thereafter that feed gas is introduced into the reactor. In the disclosure, the feed gas is prepared according to the molar ratio of the ethylene: the propylene:the hydrogen being 1:(4-5):(0.01-0.03), followed by adding the vanadium-based main catalyst, the cocatalyst and the activator. An addition amount of the vanadium-based main catalyst is in a range of 0.02 millimoles per 100 milliliter of the solvent (mmol/100 mL) to 0.1 mmol/100 mL, an addition amount of the cocatalyst is in a range of 0.02 mmol/100 mL to 10 mmol/100 mL, and an addition amount of the activator is in a range of 0.02 mmol/100 mL to 8 mmol/100 mL. During the reaction process, the pressure of the copolymerization is controlled to be constant at 0.1 MPa to 1.0 MPa through a feed gas filling valve. After 30 minutes to 120 minutes of the copolymerization, the ethanol is added to terminate the copolymerization reaction.

In the disclosure, the reactor used in the copolymerization reaction is a jacketed reactor, and the jacketed reactor is used to control the reaction temperature by introducing a cooling medium.

In the disclosure, when the ethylene, the propylene, the diolefin, and the molecular weight regulator are copolymerized under the vanadium-based catalytic system described in the above technical solution, the copolymerization reaction is carried out as follows.

A reactor is subjected to anhydrous and anaerobic treatment, and then a solvent equivalent to 40%-70% of the reactor volume is added to the reactor, thereafter that feed gas is introduced into the reactor. In the disclosure, the feed gas is prepared according to the molar ratio of the ethylene: the propylene:the hydrogen being 1:(4-5):(0.01-0.03), followed by adding the vanadium-based main catalyst, the cocatalyst, the activator, and the diolefin. An addition amount of the vanadium-based main catalyst is in a range of 0.02 mmol per 100 mL of the solvent (mmol/100 mL) to 0.1 mmol/100 mL, an addition amount of the cocatalyst is in a range of 0.02 mmol/100 mL to 10 mmol/100 mL, an addition amount of the activator is in a range of 0.02 mmol/100 mL to 8 mmol/100 mL, and an addition amount of the diolefin is in a range of 2 mmol/100 mL to 8 mmol/100 mL. During the reaction process, the pressure of the copolymerization is controlled to be constant at 0.1 MPa to 1.0 MPa through a feed gas filling valve. After 30 minutes to 120 minutes of the copolymerization, the ethanol is added to terminate the copolymerization reaction.

In the disclosure, the reactor used in the copolymerization reaction is a jacketed reactor, and the jacketed reactor is used to control the reaction temperature by introducing a cooling medium.

To better understand the disclosure, the following further describes the content of the disclosure in combination with embodiments, but the content of the disclosure is not limited to the following embodiments.

An activity of a catalyst is calculated based on a mass of dry rubber produced by per mole of the vanadium-based main catalyst with a unit of g polymer/(mol of V).

According to SH/T 1751-2005, contents of the ethylene monomer and the propylene monomer of the EPM are determined by Fourier transform infrared (FTIR) spectrometer.

According to GB/T 21864-2008, a weight average molecular weight and a molecular weight distribution of an obtained copolymer are determined by high performance size exclusion chromatography (HPSEC).

Embodiment 1

A polymerization reaction (i.e., copolymerization) is carried out in a stainless-steel jacketed polymerization kettle with a volume of 2 litters (L). The kettle is firstly subjected to anhydrous and anaerobic treatment for 1 hour, and then 1 L of dry hexane (water content is less than or equal to 10 parts per million abbreviated as ppm) is added into the kettle, and then a feed gas with a molar ratio of ethylene: propylene:hydrogen of 1:4.5:0.015 is introduced into the kettle, followed by adding 0.3 mmol of a vanadium-based main catalyst of a vanadium dichloride ethoxy oxide (VO(OEt)$Cl_2$, abbreviated as VX), 6 mmol of a cocatalyst of a ethylaluminum sesquichloride (abbreviated as AQ), and 1.5 mmol of an activator of an ethyl 2-fluoro-2-(3,4-dibromophenyl) acetate (abbreviated as FDBPAE). The polymerization reaction is carried out at a room temperature, and a pressure of the polymerization reaction is controlled to be constant at 0.5 MPa through a feed gas filling valve during the reaction, and a time of the polymerization reaction is 30 minutes. After the polymerization reaction is completed, a latex is released from a bottom tube of the polymerization kettle, and then the reaction is terminated by an ethanol, and then a large amount of ethanol is used to precipitate an EPM, and the precipitated EPM is dried in a vacuum oven to obtain 48.26 grams (g) of a dry rubber.

An activity of the catalysts in the embodiment 1 is calculated to be $1.61\times10^5$ g polymer/(mol of V). A weight average molecular weight of the obtained dry rubber is about 110,000, a relative molecular weight distribution of the obtained dry rubber is 2.4, an ethylene content of the obtained dry rubber is 55.0%, and a propylene content of the obtained dry rubber is 45.0%.

Compared with a control example 1, the catalytic activity of the catalyst system is increased by 53.3%.

Embodiment 2

Compared with the embodiment 1, a difference is that an addition amount of the AQ is changed to 12 mmol, thereby obtaining 73.01 g of a dry rubber.

An activity of the catalysts in the embodiment 2 is calculated to be $2.43\times10^5$ g polymer/(mol of V). A weight average molecular weight of the obtained dry rubber is about 140,000, a relative molecular weight distribution of the obtained dry rubber is 2.7, an ethylene content of the obtained dry rubber is 53.6%, and a propylene content of the obtained dry rubber is 46.4%.

Compared with a control example 2, the catalytic activity of the catalyst system is increased by 24.6%.

Embodiment 3

Compared with the embodiment 1, a difference is that an addition amount of the AQ is changed to 18 mmol, thereby obtaining 71.43 g of a dry rubber.

An activity of the catalysts in the embodiment 3 is calculated to be $2.38\times10^5$ g polymer/(mol of V). A weight average molecular weight of the obtained dry rubber is about 170,000, a relative molecular weight distribution of the obtained dry rubber is 3.1, an ethylene content of the obtained dry rubber is 50.2%, and a propylene content of the obtained dry rubber is 49.8%.

Compared with a control example 3, the catalytic activity of the catalyst system is increased by 25.3%.

Embodiment 4

Compared with the embodiment 1, a difference is that an addition amount of the AQ is changed to 24 mmol, thereby obtaining 69.89 g of a dry rubber.

An activity of the catalysts in the embodiment 4 is calculated to be $2.33\times10^5$ g polymer/(mol of V). A weight average molecular weight of the obtained dry rubber is about 120,000, a relative molecular weight distribution of the obtained dry rubber is 2.8, an ethylene content of the obtained dry rubber is 51.6%, and a propylene content of the obtained dry rubber is 48.4%.

Compared with a control example 4, the catalytic activity of the catalyst system is increased by 26.6%.

Embodiment 5

Compared with the embodiment 1, a difference is that a vanadium-based main catalyst and an activator are varied. An addition amount of the vanadium-based main catalyst is 0.3 mmol of a vanadium diethoxychloride ($VO(OEt)_2Cl$, abbreviated as VY), and an addition amount of the activator is 1.5 mmol of an ethyl 2,2-difluoro-2-(3-chlorophenyl) acetate (abbreviated as DFCPAE), thereby obtaining 63.57 g of a dry rubber.

An activity of the catalysts in the embodiment 5 is calculated to be $2.12\times10^5$ g polymer/(mol of V). A weight average molecular weight of the obtained dry rubber is about 160,000, a relative molecular weight distribution of the obtained dry rubber is 2.7, an ethylene content of the obtained dry rubber is 53.8%, and a propylene content of the obtained dry rubber is 46.2%.

Compared with a control example 5, the catalytic activity of the catalyst system is increased by 31.7%.

Embodiment 6

Compared with the embodiment 3, a difference is that a cocatalyst of an alkyl aluminum halide and an activator are varied. An addition amount of the cocatalyst is 18 mmol of a diethyl aluminum monochloride (abbreviated as DEAC), and an addition amount of the activator is 1.5 mmol of a 2-chlorophenylacetic acid-β-chloroethanol ester (abbreviated as CPCAE), thereby obtaining 65.68 g of a dry rubber.

An activity of the catalysts in the embodiment 6 is calculated to be $2.19\times10^5$ g polymer/(mol of V). A weight average molecular weight of the obtained dry rubber is about 150,000, a relative molecular weight distribution of the obtained dry rubber is 2.8, an ethylene content of the obtained dry rubber is 53.9%, and a propylene content of the obtained dry rubber is 46.1%.

Compared with a control example 6, the catalytic activity of the catalyst system is increased by 23.0%.

Control Example 1

Compared with the embodiment 1, a difference is that an activator is changed into an ethyl trichloroacetate (abbreviated as ETCA), thereby obtaining 31.62 g of a dry rubber. An activity of the catalysts in the control example 1 is calculated to be $1.05\times10^5$ g polymer/(mol of V). A weight average molecular weight of the obtained dry rubber is about 140, 000, a relative molecular weight distribution of the obtained dry rubber is 2.9, an ethylene content of the obtained dry rubber is 55.9%, and a propylene content of the obtained dry rubber is 44.1%.

Control Example 2

Compared with the embodiment 2, a difference is that an activator is changed into an ETCA, thereby obtaining 58.52 g of a dry rubber. An activity of the catalysts in the control example 2 is calculated to be $1.95\times10^5$ g polymer/(mol of V). A weight average molecular weight of the obtained dry rubber is about 120,000, a relative molecular weight distribution of the obtained dry rubber is 2.7, an ethylene content of the obtained dry rubber is 53.6, and a propylene content of the obtained dry rubber is 46.4%.

Control Example 3

Compared with the embodiment 3, a difference is that an activator is changed into an ETCA, thereby obtaining 56.86 g of a dry rubber. An activity of the catalysts in the control example 3 is calculated to be $1.90\times10^5$ g polymer/(mol of V). A weight average molecular weight of the obtained dry rubber is about 140,000, a relative molecular weight distribution of the obtained dry rubber is 2.8, an ethylene content of the obtained dry rubber is 50.6%, and a propylene content of the obtained dry rubber is 49.4%.

Control Example 4

Compared with the embodiment 4, a difference is that an activator is changed into an ETCA, thereby obtaining 55.25 g of a dry rubber. An activity of the catalysts in the control example 4 is calculated to be $1.84\times10^5$ g polymer/(mol of V). A weight average molecular weight of the obtained dry rubber is about 130,000, a relative molecular weight distribution of the obtained dry rubber is 2.8, an ethylene content of the obtained dry rubber is 51.6%, and a propylene content of the obtained dry rubber is 48.4%.

Control Example 5

Compared with the embodiment 5, a difference is that an activator is changed into an ETCA, thereby obtaining 48.34 g of a dry rubber. An activity of the catalysts in the control example 5 is calculated to be $1.61\times10^5$ g polymer/(mol of V). A weight average molecular weight of the obtained dry rubber is about 130,000, a relative molecular weight distribution of the obtained dry rubber is 2.7, an ethylene content of the obtained dry rubber is 53.8%, and a propylene content of the obtained dry rubber is 46.2%.

Control Example 6

Compared with the embodiment 6, a difference is that an activator is changed into an ETCA, thereby obtaining 53.38 g of a dry rubber. An activity of the catalysts in the control example 6 is calculated to be $1.78\times10^5$ g polymer/(mol of V). A weight average molecular weight of the obtained dry rubber is about 130,000, a relative molecular weight distribution of the obtained dry rubber is 2.9, an ethylene content of the obtained dry rubber is 53.1%, and a propylene content of the obtained dry rubber is 46.9%.

Relevant parameters such as yield, catalytic activity, weight average molecular weight, molecular weight distribution, ethylene content, propylene content, etc. in the embodiments 1-6 and the control examples 1-6 are shown in the following Table 1.

| | Main catalyst | Cocatalyst | Activator | Activator addition amount/ mmol | Al/V | Yield/g | Catalytic activity/ $10^5$ g polymer. (m−1) | Ethylene content/ % | Propylene content/ % | Weight average molecular weight Mw/x$10^5$ | Molecular weight distribution |
|---|---|---|---|---|---|---|---|---|---|---|---|
| Embodiment 1 | VX | AQ | FDBPAE | 1.5 | 20 | 48.26 | 1.61 | 55.0 | 45.0 | 1.14 | 2.4 |
| Embodiment 2 | VX | AQ | FDBPAE | 1.5 | 40 | 73.01 | 2.43 | 53.6 | 46.4 | 1.21 | 2.7 |
| Embodiment 3 | VX | AQ | FDBPAE | 1.5 | 60 | 71.43 | 2.38 | 50.2 | 49.8 | 1.44 | 3.1 |
| Embodiment 4 | VX | AQ | FDBPAE | 1.5 | 80 | 69.89 | 2.33 | 51.6 | 48.4 | 1.23 | 2.8 |
| Embodiment 5 | VY | AQ | DFCPAE | 1.5 | 20 | 63.57 | 2.12 | 53.8 | 46.2 | 1.34 | 2.7 |
| Embodiment 6 | VX | DEAC | CPCAE | 1.5 | 60 | 65.58 | 2.19 | 53.9 | 46.1 | 1.47 | 2.8 |
| Control example 1 | VX | AQ | ETCA | 1.5 | 20 | 31.62 | 1.05 | 55.9 | 44.1 | 1.41 | 2.9 |
| Control example 2 | VX | AQ | ETCA | 1.5 | 40 | 58.52 | 1.95 | 53.6 | 46.4 | 1.21 | 2.7 |
| Control example 3 | VX | AQ | ETCA | 1.5 | 60 | 56.86 | 1.90 | 50.6 | 49.4 | 1.42 | 2.8 |
| Control example 4 | VX | AQ | ETCA | 1.5 | 80 | 55.25 | 1.84 | 51.6 | 48.4 | 1.34 | 2.8 |
| Control example 5 | VY | AQ | ETCA | 1.5 | 20 | 48.34 | 1.61 | 53.8 | 46.2 | 1.34 | 2.7 |
| Control example 6 | VX | DMAC | ETCA | 1.5 | 60 | 53.38 | 1.78 | 53.1 | 46.9 | 1.33 | 2.9 |

Embodiment 7

A polymerization reaction is carried out in a stainless-steel jacketed polymerization kettle with a volume of 2 L. The kettle is firstly subjected to anhydrous and anaerobic treatment for 1 h, and then 1 L of dry hexane (water content≤10 ppm) is added into the kettle, and then a feed gas formulated in a molar ratio of ethylene:propylene:hydrogen of 1:4.5:0.015 is introduced into the kettle, followed by adding 0.3 mmol of a vanadium-based main catalyst of a $VO(OEt)Cl_2$ (abbreviated as VX), 6 mmol of a cocatalyst of an ethylaluminum sesquichloride (abbreviated as AQ), 1.5 mmol of an activator of an ethyl 2-fluoro-2-(3,4-dibromophenyl) acetate (abbreviated as FDBPAE), and finally 35 mL of ENB.

The polymerization reaction is carried out at room temperature, and a pressure of the polymerization reaction is controlled to be constant at 0.5 MPa through a feed gas filling valve during the reaction, and a time of the polymerization reaction is 30 minutes. After the polymerization reaction is completed, a latex is released from a bottom tube of the polymerization kettle, and then the reaction is terminated by an ethanol, and then a large amount of ethanol is used to precipitate an EPDM, and the precipitated EPDM is dried in a vacuum oven to obtain 65.87 g of a dry rubber.

An activity of the catalysts in the embodiment 7 is calculated to be $2.20\times10^5$ g polymer/(mol of V). A weight average molecular weight of the obtained dry rubber is about 320,000, a relative molecular weight distribution of the obtained dry rubber is 4.7, an ethylene content of the obtained dry rubber is 38.0%, a propylene content of the obtained dry rubber is 54.9%, and an ENB content of the obtained dry rubber is 7.1%.

Compared with a control example 7, the catalytic activity of the catalyst system is increased by 21.5%.

Embodiment 8

Compared with the embodiment 7, a difference is that an addition amount of the AQ is changed to 12 mmol, thereby obtaining 68.71 g of a dry rubber.

An activity of the catalysts in the embodiment 8 is calculated to be $2.29\times10^5$ g polymer/(mol of V). A weight average molecular weight of the obtained dry rubber is about 370,000, a relative molecular weight distribution of the obtained dry rubber is 4.1, an ethylene content of the obtained dry rubber is 35.6%, a propylene content of the obtained dry rubber is 57.4%, and an ENB content of the obtained dry rubber is 7.0%.

Compared with a control example 8, the catalytic activity of the catalyst system is increased by 44.9%.

Embodiment 9

Compared with the embodiment 7, a difference is that an addition amount of the AQ is changed to 18 mmol, thereby obtaining 64.02 g of a dry rubber.

An activity of the catalysts in the embodiment 9 is calculated to be $2.13\times10^5$ g polymer/(mol of V). A weight average molecular weight of the obtained dry rubber is about 370,000, a relative molecular weight distribution of the obtained dry rubber is 4.6, an ethylene content of the obtained dry rubber is 45.7%, a propylene content of the obtained dry rubber is 46.7%, and an ENB content of the obtained dry rubber is 7.6%.

Compared with a control example 9, the catalytic activity of the catalyst system is increased by 43.0%.

Embodiment 10

Compared with the embodiment 7, a difference is that an addition amount of the AQ is changed to 24 mmol, thereby obtaining 56.23 g of a dry rubber.

An activity of the catalysts in the embodiment 10 is calculated to be $1.87\times10^5$ g polymer/(mol of V). A weight average molecular weight of the obtained dry rubber is about 360,000, a relative molecular weight distribution of the obtained dry rubber is 4.2, an ethylene content of the obtained dry rubber is 51.7%, a propylene content of the obtained dry rubber is 39.4%, and an ENB content of the obtained dry rubber is 8.9%.

Compared with a control example 10, the catalytic activity of the catalyst system is increased by 46.1%.

Embodiment 11

Compared with the embodiment 7, a difference is that a vanadium-based main catalyst and an activator are varied. An addition amount of the vanadium-based main catalyst is 0.3 mmol of a $VO(OEt)_2Cl$ (abbreviated as VY), and an addition amount of the activator is 1.5 mmol of an ethyl 2,2-difluoro-2-(3-chlorophenyl) acetate (abbreviated as DFCPAE), thereby obtaining 61.11 g of a dry rubber.

An activity of the catalysts in the embodiment 11 is calculated to be $2.04\times10^5$ g polymer/(mol of V). A weight average molecular weight of the obtained dry rubber is about 360,000, a relative molecular weight distribution of the obtained dry rubber is 5.1, an ethylene content of the obtained dry rubber is 52.6%, a propylene content of the obtained dry rubber is 38.6%, and an ENB content of the obtained dry rubber is 8.8%.

Compared with a control example 11, the catalytic activity of the catalyst system is increased by 30.8%.

Embodiment 12

Compared with the embodiment 9, a difference is that a cocatalyst of the alkyl aluminum halide and an activator are varied. An addition amount of the cocatalyst is 18 mmol of a diethyl aluminum monochloride (abbreviated as DEAC), and an addition amount of the activator is 1.5 mmol of an ethyl 2-chloro-2-(2-bromophenyl) acetate (abbreviated as CBPAE), thereby obtaining 52.55 g of a dry rubber.

An activity of the catalysts in the embodiment 12 is calculated to be $1.75\times10^5$ g polymer/(mol of V). A weight average molecular weight of the obtained dry rubber is about 350,000, a relative molecular weight distribution of the obtained dry rubber is 5.4, an ethylene content of the obtained dry rubber is 53.9%, a propylene content of the obtained dry rubber is 37.4%, and an ENB content of the obtained dry rubber is 8.7%.

Compared with a control example 12, the catalytic activity of the catalyst system is increased by 36.7%.

Control Example 7

Compared with the embodiment 7, a difference is that an activator is changed into an ethyl trichloroacetate (abbreviated as ETCA), thereby obtaining 54.35 g of a dry rubber. An activity of the catalysts in the control example 7 is calculated to be $1.81\times10^5$ g polymer/(mol of V). A weight average molecular weight of the obtained dry rubber is about 340,000, a relative molecular weight distribution of the obtained dry rubber is 5.1, an ethylene content of the obtained dry rubber is 51.9%, a propylene content of the obtained dry rubber is 40.7%, and an ENB content of the obtained dry rubber is 7.4%.

Control Example 8

Compared with the embodiment 8, a difference is that an activator is changed into an ETCA, thereby obtaining 47.52 g of a dry rubber. An activity of the catalysts in the control example 8 is calculated to be $1.58\times10^5$ g polymer/(mol of V). A weight average molecular weight of the obtained dry rubber is about 360,000, a relative molecular weight distribution of the obtained dry rubber is 5.4, an ethylene content of the obtained dry rubber is 48.8%, a propylene content of the obtained dry rubber is 43%, and an ENB content of the obtained dry rubber is 8.2%.

Control Example 9

Compared with the embodiment 9, a difference is that an activator is changed into an ETCA, thereby obtaining 44.61 g of a dry rubber. An activity of the catalysts in the control example 9 is calculated to be $1.49\times10^5$ g polymer/(mol of V). A weight average molecular weight of the obtained dry rubber is about 360,000, a relative molecular weight distribution of the obtained dry rubber is 5.2, an ethylene content of the obtained dry rubber is 50.6%, a propylene content of the obtained dry rubber is 39.8%, and an ENB content of the obtained dry rubber is 9.6%.

Control Example 10

Compared with the embodiment 10, a difference is that an activator is changed into an ETCA, thereby obtaining 20.07 g of a dry rubber. An activity of the catalysts in the control example 10 is calculated to be $0.67\times10^5$ g polymer/(mol of V). A weight average molecular weight of the obtained dry rubber is about 350,000, a relative molecular weight distribution of the obtained dry rubber is 5.1, an ethylene content of the obtained dry rubber is 53.1%, a propylene content of the obtained dry rubber is 36.3%, and an ENB content of the obtained dry rubber is 10.6%.

Control Example 11

Compared with the embodiment 11, a difference is that an activator is changed into an ETCA, thereby obtaining 19.76 g of a dry rubber. An activity of the catalysts in the control example 11 is calculated to be $0.66\times10^5$ g polymer/(mol of V). A weight average molecular weight of the obtained dry rubber is about 420,000, a relative molecular weight distribution of the obtained dry rubber is 4.8, an ethylene content of the obtained dry rubber is 54.1%, a propylene content of the obtained dry rubber is 35.7%, and an ENB content of the obtained dry rubber is 10.2%.

Control Example 12

Compared with the embodiment 12, a difference is that an activator is changed into an ETCA, thereby obtaining 51.32 g of a dry rubber. An activity of the catalysts in the control example 12 is calculated to be $1.71\times10^5$ g polymer/(mol of V). A weight average molecular weight of the obtained dry rubber is about 360,000, a relative molecular weight distribution of the obtained dry rubber is 5.2, an ethylene content of the obtained dry rubber is 53.1%, a propylene content of the obtained dry rubber is 37.6%, and an ENB content of the obtained dry rubber is 9.3%.

Relevant parameters such as yield, catalytic activity, weight average molecular weight, molecular weight distribution, ethylene content, propylene content, etc. in the embodiments 7-12 and the control examples 7-12 are shown in the following Table 2.

| | Main catalyst | Cocatalyst | Activator | Activator addition amount/ mmol | Al/ V | Yield/ g | Catalytic activity/ $10^5$ g polymer. (m−1) | Ethylene content/ % | Propylene content/ % | ENB content/ % | Weight average molecular weight Mw/$\times10^5$ | Molecular weight distribution |
|---|---|---|---|---|---|---|---|---|---|---|---|---|
| Embodiment 7 | VX | AQ | FDBPAE | 1.5 | 20 | 65.87 | 2.20 | 38.0 | 54.9 | 7.1 | 3.19 | 4.7 |
| Embodiment 8 | VX | AQ | FDBPAE | 1.5 | 40 | 68.71 | 2.29 | 35.6 | 57.4 | 7 | 6.39 | 4.1 |
| Embodiment 9 | VX | AQ | FDBPAE | 1.5 | 60 | 64.02 | 2.13 | 45.7 | 46.7 | 7.6 | 3.70 | 4.6 |
| Embodiment 10 | VX | AQ | FDBPAE | 1.5 | 80 | 56.23 | 1.87 | 51.7 | 39.4 | 8.9 | 3.62 | 4.2 |
| Embodiment 11 | VY | AQ | DFCPAE | 1.5 | 20 | 61.11 | 2.04 | 52.6 | 38.6 | 8.8 | 3.61 | 5.1 |
| Embodiment 12 | VX | DEAC | CBPAE | 1.5 | 60 | 52.55 | 1.75 | 53.9 | 37.4 | 8.7 | 3.59 | 5.4 |
| Control example 7 | VX | AQ | ETCA | 1.5 | 20 | 54.35 | 1.81 | 51.9 | 40.7 | 7.4 | 3.42 | 5.1 |
| Control example 8 | VX | AQ | ETCA | 1.5 | 40 | 47.52 | 1.58 | 48.8 | 43.0 | 8.2 | 3.59 | 5.4 |

-continued

| | Main catalyst | Cocat-alyst | Activator | Activator addition amount/ mmol | Al/ V | Yield/ g | Catalytic activity/ $10^5$ g polymer. (m−1) | Ethylene content/ % | Propylene content/ % | ENB content/ % | Weight average molecular weight Mw/×$10^5$ | Molecular weight distribution |
|---|---|---|---|---|---|---|---|---|---|---|---|---|
| Control example 9 | VX | AQ | ETCA | 1.5 | 60 | 44.61 | 1.49 | 50.6 | 39.8 | 9.6 | 3.62 | 5.2 |
| Control example 10 | VX | AQ | ETCA | 1.5 | 80 | 38.25 | 1.28 | 51.5 | 38.2 | 10.3 | 3.70 | 5.8 |
| Control example 11 | VY | AQ | ETCA | 1.5 | 20 | 46.65 | 1.56 | 53.8 | 38.1 | 8.1 | 3.62 | 5.7 |
| Control example 12 | VX | DMAC | ETCA | 1.5 | 60 | 38.36 | 1.25 | 53.1 | 37.8 | 9.1 | 3.73 | 5.3 |

The above description is only the illustrated embodiments of the disclosure. It should be noted that for those skilled in the related art, several improvements and modifications can be made without departing from the principles of the disclosure. These improvements and modifications should also be considered as the scope of the protection of the disclosure.

What is claimed is:

1. A vanadium-based catalytic system, comprising an activator substituted by a plurality of halogen atoms;

wherein the activator is a halogenated ethyl phenylacetate substituted by at least two of the plurality of halogen atoms;

wherein one of a phenyl position and a benzyl position of the halogenated ethyl phenylacetate is substituted by at least one of the plurality of halogen atoms; and wherein the activator is an ethyl 2-fluoro-2-(3,4-dibromophenyl) acetate.

2. The vanadium-based catalytic system as claimed in claim 1, further comprising: a vanadium-based catalyst;

wherein the vanadium-based catalyst is vanadium dichloride ethoxy oxide ($VO(OEt)Cl_2$).

3. The vanadium-based catalytic system as claimed in claim 2, further comprising a cocatalyst, wherein the cocatalyst is an organoaluminum compound.

4. The vanadium-based catalytic system as claimed in claim 3, wherein a molar ratio of aluminum atoms contained in the cocatalyst to the vanadium contained in the vanadium-based catalyst is (1-100): 1; and a molar ratio of the activator to the vanadium contained in the vanadium-based catalyst is (5-80): 1.

5. The vanadium-based catalytic system as claimed in claim 1, further comprising: a vanadium-based catalyst;

wherein the vanadium-based catalyst is vanadium diethoxychloride ($VO(OEt)_2Cl$).

* * * * *